UNITED STATES PATENT OFFICE 2,440,717

PREVENTION OF FORMATION OF COLORS IN THIOCYANATES

William H. Hill and James H. F. Veltman, Mount Lebanon, Pa., assignors to Koppers Company, Inc., Pittsburgh, Pa., a corporation of Delaware No Drawing. Original application April 18, 1944, Serial No. 531,644. Divided and this application July 11, 1945, Serial No. 604,533

7 Claims. (Cl. 23—75)

The present invention relates in general to the production of stable, colorless thiocyanates, and has reference more particularly to prevention of the discoloration of ammonium thiocyanate which has been manufactured from the gases produced by the destructive distillation of coal and found particularly in the scrubbing liquors used in refining coke oven gas.

In the manufacture, distribution, and use of thiocyanates, there has often been observed in these salts a formation of reddish color varying in intensity from faint pink to deep red. Troublesome dyes or colored solutions often are found in the crude thiocyanate solutions associated with coke-oven-gas purification liquors. Even though purification steps, such, for example, as ammoniating and sulphiding the thiocyanate solution, filtering off insoluble iron sulphide and thereafter treating the thiocyanate filtrate with activated carbon have been employed in crystallization to provide a clear, colorless crystalline product, discoloration of the so-produced colorless salt will nevertheless occur in storage and especially will it do so when the salt is exposed to natural or artificial light.

This application has been divided from the inventors' pending application Serial No. 531,644, filed April 18, 1944, now issued as Patent No. 2,404,576.

An object of the present invention is to provide economical means of producing a clear, colorless purified thiocyanate salt that is color stable in spite of protracted storage, exposure to light or contact with iron.

A further object of the present invention is to prevent that discoloration of clear-white purified thiocyanates which occurs upon storage.

The invention has for further objects such other improvements and such other operative advantages or results as may be found to obtain in the processes or apparatus hereinafter described or claimed.

According to the present invention thiocyanates such for example as ammonium, sodium, potassium, barium, calcium, guanidine, and other organic amino thiocyanates are stabilized against color changes by addition thereto of small quantities of one or more of certain inhibitors which have been found to prevent discoloration of the thiocyanates. These inhibitors include compounds of phosphoric, metaphosphoric, pyrophosphoric, and arsenic acids and are selected from the group consisting in the non-oxidizing acids of the fifth group of the periodic table. As is often to be observed in chemical phenomena, the leading members of the group exhibit most strongly the common characteristic, which in the present case is their capacity in small quantities in thiocyanates to prevent discoloration of the latter. Thus, the phosphoric acids and derivatives thereof are especially beneficial as inhibitors and appear to lend the greatest stability to stored thiocyanates.

Unless free alkalinity exists in the thiocyanate solution to which coloration-inhibitor is to be added, the salts of the above-mentioned inhibitors rather than the acids themselves are preferably employed in order to avoid any deleterious effect of the acid upon the so-treated thiocyanate, such effect being, for example, the formation of yellow, perthiocyanic acid. The selected salts are preferably those having the same cation as the thiocyanate being treated, thereby to reduce the total amount of impurities so-added to the technical salt.

The addition of such inhibitors can be made at any time during or after the manufacture of the thiocyanates, and even if the salt is discolored prior to the present treatment, an addition of one or more of the above-mentioned inhibitors will cause a material lightening of the said discolored salt. However, addition of the inhibitor is preferably made to the crude thiocyanate solution prior to crystallization, whereby a more intimate mixture and a more thorough distribution of inhibitor compound throughout the subsequently formed crystal is obtained thus providing more comprehensive protection of the inhibited product.

In the hereinafter described examples illustrating the present invention, the thiocyanate salt that has been employed for test purposes is an ammonium thiocyanate obtained in impure state in approximately 30% solution by the scrubbing of coke-oven gas with an aqueous suspension of sulphur. The said thiocyanate solution, which often contains some iron and other impurities such, for example, as thiosulphates, can be purified and concentrated according to known procedure to produce a colorless, techincal thiocyanate salt of at least 95% purity. The so-produced salt, however, soon discolors in storage and darkens with especial rapidity in sunlight or in contact with iron. Since the said thiocyanate solution of the following examples is slightly ammoniacal, the inhibiting anions can be added directly in acid form and the acid will be neutralized by the said solution.

The following are examples of treatment of thiocyanate salts with discoloration inhibitor whereby purified colorless thiocyanates will retain their colorless appearance on storing.

Example 1

A crude ammonium thiocyanate solution of about 30% salt concentration such as is produced at a by-product coke plant by scrubbing cooled gas with a suspension of sulphur, was treated with an activated carbon to remove organic matter and was then filtered. The filtrate was concentrated by heating to about 130° C. whereby sulphur and other impurities were precipitated. These impurities were filtered off while maintaining the above-mentioned high temperature and thereafter 1% diammonium phosphate by weight of the ammonium thiocyanate contained in solution was added. Thereafter, the solution was cooled whereupon sparkling colorless crystals of ammonium thiocyanate were formed. The recovered crystals were substantially color stable for over a year, although they were kept in clear glass jars and thus were exposed to light. Ammonium thiocyanate crystals prepared in the same manner without employment of an inhibitor darkened to a red-brown color after standing for less than five months.

Example 2

Each of the hereinbelow listed inhibitors were added to samples of 30% crude ammonium thiocyanate liquor, the various weights thereof which were added being chemically equivalent. To the solutions were then added 2% ammonia and 1% hydrogen sulphide. After standing for one hour the solutions were filtered. The filtrates were heated to 110° C., treated with 2% by weight of G-60 Darco and filtered. After cooling of the solutions and crystallization of ammonium thiocyanate therefrom, the crystals were filtered off, placed in closed jars and exposed to daylight. During the ensuing test period, the relative resistances to discoloration of the variously inhibited ammonium thiocyanate crystals were compared.

Example 2.—Table

| Inhibitor Added | Weight in percent of dry $NH_4SCN$ | Color of $NH_4SCN$ crystals as obtained | Color after approximately five months' exposure to daylight |
| --- | --- | --- | --- |
| Diammonium phosphate. | 1.11 | white | yellow. |
| Pyrophosphoric acid | 1.11 | do | white. |
| Metaphosphoric acid | 2.00 | do | grayish white. |
| Ammonium phosphite | 0.76 | do | white. |

In all the above examples the weight of inhibitor remaining in each batch of crystals after filtration and crystallization of the treated solution was materially reduced, for example as shown in our copending parent application above referred to, in one case where 0.70% of formic acid was added to the solution, less than one-tenth of one-percent inhibitor, by weight of product, was found in the salt. In every case, in fact, where analysis was made of the inhibitor content of color-stabilized salt, the inhibitor concentration was found to be less than 0.1% by weight. It is apparent, therefore, that the so-added inhibitors are not present in the treated thiocyanate to an extent sufficient to affect the standard of purity for technical thiocyanates.

Example 3

A crude ammonium thiocyanate solution of about 30% salt concentration such as described in Example 1 was treated with 2% ammonia and 1% hydrogen sulphide and filtered. The filtrate was concentrated by heating the same to a boiling temperature of 110° C. and was thereafter treated with 2% Darco G-60. The so-treated solution was then concentrated to a boiling temperature of 128° C. and filtered through a steam funnel. To the so-produced filtrate was added 2.06% ammonium arsenate by weight of the ammonium thiocyanate contained in solution. To remove insoluble particles the solution was reheated and filtered once more through a steam funnel. The solution was then allowed to cool and crystals of ammonium thiocyanate were crystallized therefrom. The said thiocyanate crystals were dried on filter paper and were stored in a glass bottle; they were exposed to daylight for over one year and did not discolor. White crystals of ammonium thiocyanate prepared in precisely the same manner but to which no arsenate or other inhibitor was added turned a dark red-brown after less than four months' storage under identical conditions.

It has been discovered during the development of the present invention that, when small amounts of the above-mentioned inhibitors are added to thiocyanates before or during crystallization, the habitus of crystallization is so altered that a marked change in the physical appearance of the thiocyanate salt is obtained. It again appears that the first members of the chemical group from which the inhibitors have been selected is the most effective; this is especially true of diammonium phosphate and ammonium pyrophosphate, a notable example being provided by the former compound in which instance 1.11% by weight was added to ammonium thiocyanate whereby sparkling white ammonium thiocyanate crystals were ultimately obtained. These so-produced crystals were stored in the presence of light for a protracted period and were subjected to intermittent handling, but at the conclusion of the test they nevertheless retained their original size and exhibited the same sparkling, clear-white appearance.

The term "alkali thiocyanate" as employed in the claims hereinafter made is intended to encompass not only the thiocyanates of the fixed alkali metals such, for example, as sodium and potassium, but also the thiocyanate of ammonia, which is sometimes termed "volatile alkali," and the organic amino thiocyanates such as that of guanidine.

The invention as hereinabove set forth is embodied in particular form and manner but may be variously embodied within the scope of the claims hereinafter made.

We claim:

1. Colorless ammonium thiocyanate containing more than about 0.1% and less than about 1% by weight of a discoloration inhibitor selected from the group consisting of the phosphorus and arsenic acids and their salts.

2. Colorless ammonium thiocyanate containing a discoloration inhibitor selected from the group consisting of the phosphorus and arsenic acids and their salts.

3. Colorless ammonium thiocyanate containing more than about 0.1% and less than about 1% by weight of a phosphorus acid anion.

4. A method for preventing the discoloration of colorless thiocyanates, said method comprising the steps of: purifying crude thiocyanate salt and decolorizing the same; and injecting into said salt while in an aqueous solution minute quantities of a discoloration inhibitor selected from the group consisting of the phosphorus and arsenic acids and their salts.

5. A method for preventing the discoloration of colorless thiocyanates, said method comprising the steps of: purifying crude thiocyanate and decolorizing the same; and injecting into said salt small quantities of a discoloration inhibitor selected from the group consisting of the phosphorus and arsenic acids and their salts, the cation of the said salts being the same as that of the treated thiocyanate salt.

6. A method for preventing the discoloration of colorless, ammonium thiocyanate, said method comprising the steps of: purifying crude ammonium thiocyanate and decolorizing the same; and injecting into said salt prior to crystallization minute quantities of a discoloration inhibitor selected from the group consisting of the phosphorus and arsenic acids and their salts.

7. A method for producing clear, colorless ammonium thiocyanate crystals that are stabilized against color change by storage, contact with metal, sunlight, and like discolorants, said method comprising: treating crude ammonium thiocyanate solution with ammonia and hydrogen sulphide and thereafter filtering off precipitates; heating so-derived filtrate and treating the same with activated carbon; removing said carbon from so-treated thiocyanate solution; adding to the thiocyanate solution a salt of a phosphorus acid; and crystallizing from so-treated solution clear, colorless ammonium thiocyanate crystals containing by weight thereof at most less than 1% of said phosphorus acid salt.

WILLIAM H. HILL.
JAMES H. F. VELTMAN.